(12) United States Patent
Rhein et al.

(10) Patent No.: US 6,780,032 B2
(45) Date of Patent: Aug. 24, 2004

(54) LOOP BACK CLOCKSPRING CONNECTOR HAVING HIGH CURRENT CAPACITY

(75) Inventors: David J. Rhein, Memphis, MI (US); Suresh N. Thota, Clinton Twp., MI (US); Sheikh H. Rahman, Macomb Twp., MI (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/266,032

(22) Filed: Oct. 7, 2002

(65) Prior Publication Data

US 2004/0067670 A1 Apr. 8, 2004

(51) Int. Cl.⁷ ............................................. H01R 3/00
(52) U.S. Cl. ..................................................... 439/164
(58) Field of Search .................................. 439/164, 15

(56) References Cited

U.S. PATENT DOCUMENTS

| | | | |
|---|---|---|---|
| 3,763,455 A | | 10/1973 | Confer et al. |
| 4,048,558 A | * | 9/1977 | Goodman ................... 324/609 |
| 4,978,191 A | | 12/1990 | Hasegawa et al. |
| 5,149,273 A | | 9/1992 | Bannaai et al. |
| 5,171,153 A | | 12/1992 | Kubota et al. |
| 5,252,085 A | | 10/1993 | Kato et al. |
| 5,277,604 A | | 1/1994 | Ida et al. |
| 5,310,356 A | | 5/1994 | Obata et al. |
| 5,409,389 A | | 4/1995 | Shibata et al. |
| 5,413,492 A | | 5/1995 | Obata |
| 5,637,005 A | | 6/1997 | Bannai et al. |
| 5,643,002 A | | 7/1997 | Wolf et al. |
| 5,781,692 A | * | 7/1998 | Wagner ...................... 392/411 |
| 5,785,541 A | | 7/1998 | Best et al. |
| 5,865,634 A | | 2/1999 | Best |
| 5,888,084 A | | 3/1999 | Mukai et al. |
| 5,928,018 A | | 7/1999 | Dumoulin |
| 5,980,286 A | | 11/1999 | Best et al. |
| 5,980,287 A | | 11/1999 | Sasaki |
| 6,012,935 A | | 1/2000 | Bolen et al. |
| 6,095,836 A | | 8/2000 | Bolen et al. |
| 6,213,797 B1 | | 4/2001 | Best et al. |
| 2002/0166915 A1 | | 11/2002 | Sakata ........................ 242/388 |

FOREIGN PATENT DOCUMENTS

| | | |
|---|---|---|
| DE | 44 04 407 A1 | 8/1995 |
| EP | 0 911 222 A2 | 4/1999 |
| EP | 1 056 166 A2 | 11/2000 |

* cited by examiner

Primary Examiner—Javaid H. Nasri

(57) ABSTRACT

A loop back type clockspring connector includes a first housing section and a second housing section that are rotatable with respect to each other. The first housing section and second housing section define an accommodating space. Within the accommodating space, the clockspring connector includes two or more flexible cables and two or more guiding mechanisms. The cables conduct current from one housing section to the other. The guiding mechanisms divide the accommodating space into inner and outer portions where the cable accumulates as the housing sections rotate relative to one another. The guiding mechanisms move radially inwardly and outwardly within the accommodating space as the cable accumulates with the inner and outer spaces, thereby reducing the potential for the flexible cables to bind up during operation of the connector. The clockspring connector may also include a feature for dividing high current into multiple paths within the connector, thereby reducing temperature in high current applications.

28 Claims, 11 Drawing Sheets

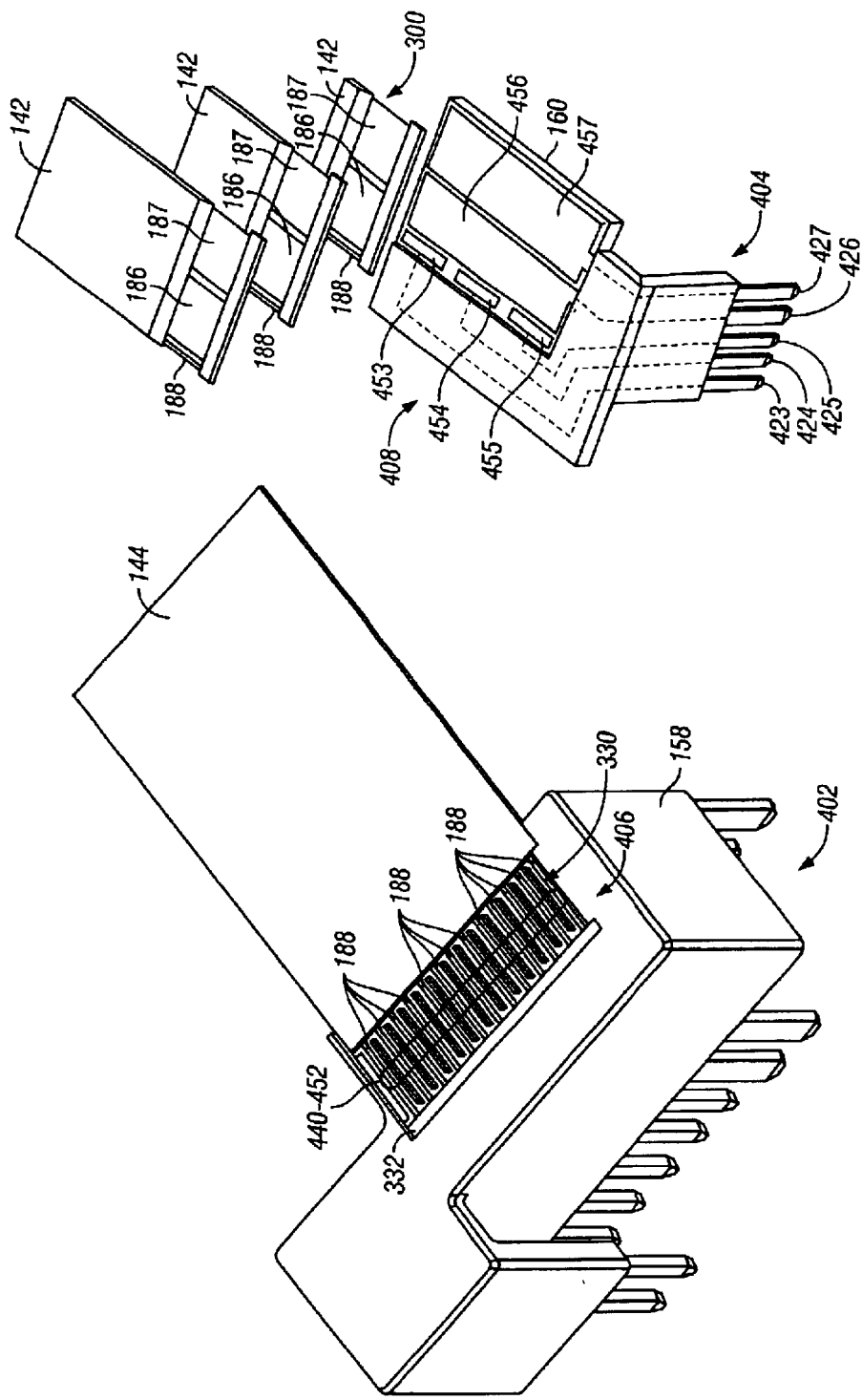

LOOP BACK CLOCKSPRING CONNECTOR HAVING HIGH CURRENT CAPACITY

BACKGROUND OF THE INVENTION

The present invention relates generally to a clockspring connector, and, more specifically to a clockspring connector that is capable of conducting high current and high numbers of circuits while keeping operational noise low. A clockspring connector is a device that allows for an electrical connection between two members that are rotatable relative to each other. One common use for the clockspring connector has been in the steering units of automobiles.

Two common clockspring designs are the cassette type clocksprings and loop back (or fold back) clocksprings. Both designs use flat flexible cables ("flex cables") to pass current between two connector portions that are rotatable relative to one another. In both designs, the flex cables have one end connected to a first portion of the connector, e.g., the inner housing or hub, and the other end of the flex cable is connected to the other housing portion, e.g., the outer housing or shell.

In the cassette type design, the flex cable is wound in a continuous circular path within an accommodating space that is defined between the first and second housing portions. As the housing portions rotate relative to each other in one direction, e.g. clockwise, the flex cable winds or accumulates around the inner housing. When the connector portions are rotated in the opposite direction, the flex cable unwinds to permit rotation of the housing portions relative to each other.

By contrast, in a loop back design, each cable has a first portion wound around the outer annular wall of the accommodating space in a first direction. The cable then loops back and extends into a second portion that is wound around the inner annular wall of the accommodating space in a second direction opposite the first direction. Loop back designs are advantageous over cassette type designs because they significantly reduce the length of cable that is required versus a cassette design. In a typical application, a loop back design uses approximately one third as much cable as a cassette type design. Since the flex cable is a relatively expensive component, loop back designs may provide a significant cost savings in comparison to cassette type designs.

Clockspring connectors are commonly used to pass current to devices, such as horn switches and cruise control switches and radio controllers, carried by the steering wheel on an automobile. As automobiles are designed with a growing number of features, it becomes necessary to increase the number of current paths (circuits) that can be carried by a clockspring connector. In order to accommodate more circuits, multiple flex cables have been used in clockspring connectors. Each cable carries one or more current paths. In many applications, it is not possible to use multiple flex cables in a cassette type clockspring connector because of size limitations on the overall envelope of the connector's housing. Hence, where multiple cables are required, a loop back clockspring connector is typically employed.

Many loop back clockspring connectors use a cable guiding mechanism (sometimes referred to as a carrier assembly) having upstanding rollers rotatably mounted on the base. Examples of this type of design are shown in U.S. Pat. Nos. 5,637,005 and 5,865,634. In such a design, the flex cables loop around individual rollers on the guiding mechanism.

In automobile applications, a clockspring connector is typically required to turn a total of 5 turns of rotation between its travel limits, namely, two-and-a-half turns both clockwise and counterclockwise from the neutral or zero position when the steering wheel of a vehicle is turned. When a loop back clockspring connector is turned, the cable is either winds around the inner or outer wall of the accommodating space, depending on the relative position of the connector portions and their direction of rotation. For example, as the cable winds around the inner wall of the accommodating space, the layers of cable accumulate (get thicker) in the inner space defined between the guiding mechanism and the inner wall. At the same time, the cables unwind from the outer wall of the accommodating space and empty from the outer space defined between the guiding mechanism and the outer wall of the accommodating space. As this occurs, the layers of cable will have tendency to move radially inward or outward, depending of the position and direction of rotation, to balance the inner and outer spaces of the accommodating space. Known clockspring connectors have a one-piece guiding mechanism, which cannot move radially inwardly or outwardly. As a result, when the cables move radially inwardly or outwardly, they impinge upon the carrier causing the cables to buckle and prevent normal operation of the clockspring connector.

It is also known to provide a loop back design that does not employ a guiding mechanism. Examples of such a design are shown in U.S. Pat. Nos. 4,978,191; 5,409,389; 5,310,356 and 5,888,084. In these patents, the clockspring uses four cables that balance one another during operation of the connector. However, in applications where only a single cable is required to satisfy the circuit requirements, these connectors still require three flex cables—one active cable and three "dummy" cables. Another problem with this design is that the cables can go out of balance, e.g., collapse, during operation, thereby rendering the connector inoperable. These designs may also require the use of a sticky grease to cause the flex cables to adhere to one another. Using such a grease is messy and undesirable, both during assembly and operation of the connector.

Automobiles also have an increasing number of applications where it is necessary to carry a relatively high current across a clockspring connector. One example of an increasingly common feature that requires the use of high current is that of the heated steering wheel. Conventional clockspring connectors are not well-suited for high current applications because the high current can overheat the flex cables, causing them to delaminate. As a result, slip rings have typically been used in high current applications. However, slip rings have a tendency to produce noise and to wear down over time. Operation noise is undesirable in automobile application, particularly in luxury brands where purchasers place a premium on quiet passenger cabins.

Therefore, it is desirable to provide a clockspring connector addresses the above and other problems with known clockspring connectors. In particular, it is desirable to provide a clockspring connector that is capable of conducting high current and high numbers of circuits without generating high temperatures. It is also desirable to provide a clockspring connector that reduces operational noise.

BRIEF SUMMARY OF THE INVENTION

A clockspring connector according to certain aspects of an embodiment of the present invention comprises a housing, at least two guiding mechanisms, and at least two flexible cables. The housing includes at least two sections that define an annular accommodating space and that are rotatable with respect to one another. In one embodiment, a first housing section may comprise a base and a cover, while a second housing section comprises a hub rotatably mounted between the base and the cover. The guiding mechanisms are disposed in the accommodating space and can move radially inwardly and outwardly within the accommodating space. Each guiding mechanism includes a base and at least one roller rotatably connected to the base. The guiding mechanism may also include flexible members that engage the housing, so as to restrict vertical movement of the carrier in the accommodating space, thereby reducing noise during operation of the clockspring. The guiding mechanisms divide the accommodating space into inner and outer portions, the sizes of which depend upon the radial position of the guiding mechanisms within the accommodating space. Each cable has one end fixed relative to the first housing section and the other fixed relative to the second housing section. The cables extend within the outer space in a first direction. Each cable then passes between two of the adjacent guiding mechanisms and loops back around one of the rollers and extends in the inner accommodating space in a second direction opposite the first direction. Using multiple guiding mechanisms that can move radially inwardly and outwardly prevents the problems associated with prior loop back clockspring connectors that employ a single guiding mechanism. The clockspring connector also includes features that divide high current into multiple reduced current paths within the connector, which reduces temperatures within the connector.

BRIEF DESCRIPTION OF SEVERAL VIEWS OF THE DRAWINGS

FIGS. 15–17 illustrate a second lead frame assembly that can be used in the clockspring of FIG. 1.

Figure 1:
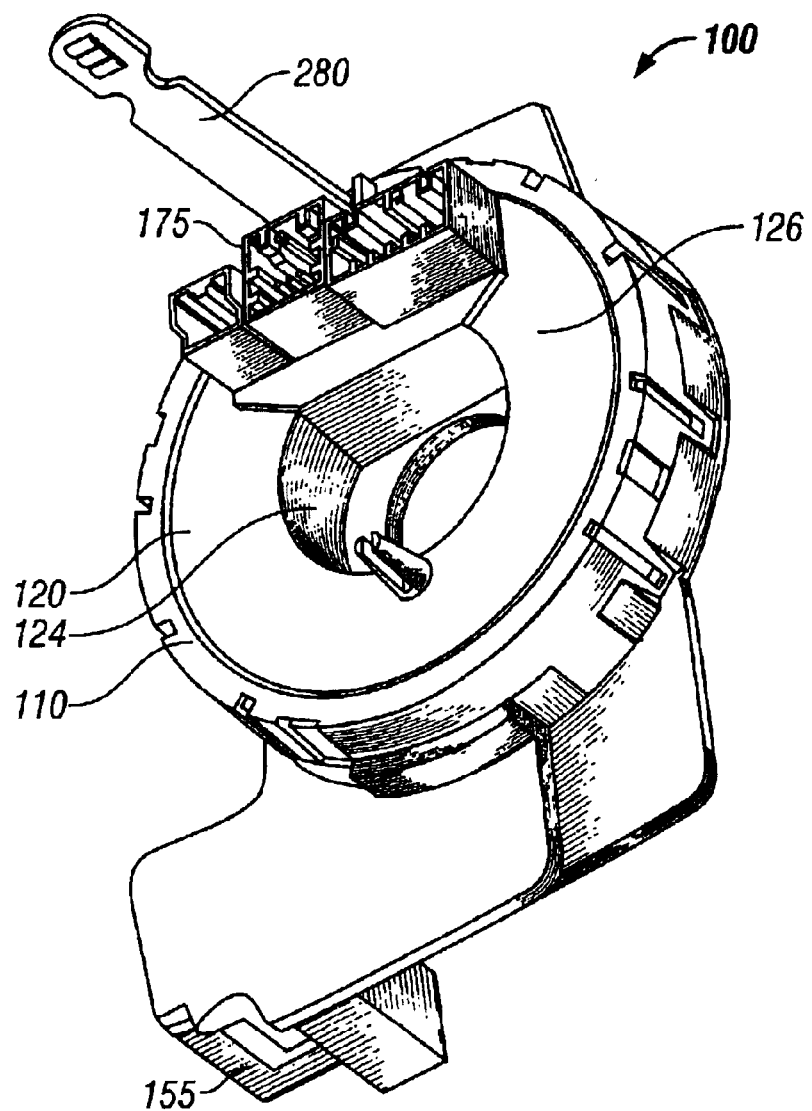
FIG. 1 is a perspective view of an assembled clockspring according to certain aspects of an embodiment of the present invention.

The foregoing summary, as well as the following detailed description of the preferred embodiments of the present invention, will be better understood when read in conjunction with the appended drawings. For the purpose of illustrating the preferred embodiments of the present invention, there is shown in the drawings, embodiments that are presently preferred. It should be understood, however, that the present invention is not limited to the arrangements and instrumentality shown in the attached drawings.

DETAILED DESCRIPTION OF THE INVENTION

A clockspring connector 10, according to one embodiment of the present invention, comprises a housing 100 consisting of an outer portion, the shell 110, and an inner portion, the hub 120. The shell 110 comprises a cover 112 and a base 114. The cover 112 and base 114 fit together to form the shell 110. The hub 120 and the shell 110 together define an annular accommodating space 125. The accommodating space 125 includes an outer annular wall 123 defined by the shell 110 and an inner annular wall 124 defined by the hub 120. The accommodating space 125 further includes top and bottom walls 126, 127. In the illustrated embodiment, the top wall 126 is defined primarily by the hub 120, while the bottom wall 127 is defined by the base 114. The hub 120 is mounted for rotation between the cover 112 and the base 114. In this respect, the top wall 126 of the hub 120 includes a reduced diameter annular wall 128 which fits for rotation in a circular opening 129 in the cover 112. Similarly, the annular wall 124 of the hub 120 includes a reduced diameter lower portion (not shown) which fits for rotation in a circular opening 131 formed in the bottom wall of the base 114.

The accommodating space 125 contains a plurality of flexible flat cables 130 and a plurality of guiding mechanisms 140. The illustrated embodiment includes four flexible, flat cables 130 and four guiding mechanisms 140, but it will be appreciated that the number of cables 130 and guiding mechanisms 140 can vary depending on the application. The clockspring connector 10 provides a flexible design that can be readily varied, e.g., by varying the number of flexible cables 130 in guiding mechanisms 140, to meet the needs, e.g., the physical size limitations and number of required circuits, of a given application.

The clockspring connector 10 can be used in applications where only one flexible cable is required. In such instances, it is beneficial to provide two guiding mechanisms 140 and two cables 130. One of the cables is an active cable and the other cable is a "dummy" cable. The active cable includes conductive paths, e.g., copper traces, for carrying the required conductive circuits across the clockspring connector 10. The dummy cable can, as a matter of convenience, include copper traces, but they are not required because the dummy cable is not used to carry circuits across the clockspring connector 10. Rather, the dummy cable is provided to balance the mechanical operation of the clockspring components.

The illustrated embodiment has an equal number of guiding mechanisms 140 and cables 130. This is beneficial for providing smooth operation of the clockspring. Alternatively, in some applications it may be desirable to have more cables than guiding mechanisms, in which case multiple cables can be passed between adjacent pairs of the guiding mechanisms. Additionally, it will also be appreciated that the exact shape and configuration of the clockspring housing 100 will vary depending on the application. For example in some embodiments the hub will comprise a cover that rotates with respect to a base, so that the hub forms the top of the accommodating space, and the base forms the bottom of the accommodating space.

The hub 120 and the shell 110 each include one or more lead frames 150, 160, 170, 180, which present terminals for interconnection with external connectors (not shown). In the illustrated embodiment, the shell 110 includes a high/low current lead frame 150, which carries both high and low current connection terminals, and a low current lead frame 160, which only carries low current terminals. Similarly, the hub 120 includes a high/low current lead frame 170 and a low current lead frame 180. The lead frames 150, 160, 170, 180 present terminals configured to mate with electrical connectors or the like so that cables (not shown) or other electronic devices (not shown) may be connected to the flexible cables 130 of the clockspring. Attachment of cables 130 to lead frames may be achieved by a variety of means including welding, soldering or press fitting. The hub 120 and shell 110 each include sockets 155, 175 for enabling connection between the lead frames 150, 160, 170, 180 and the external connectors. It will be appreciated that other lead frame configurations are possible.

Figure 2:
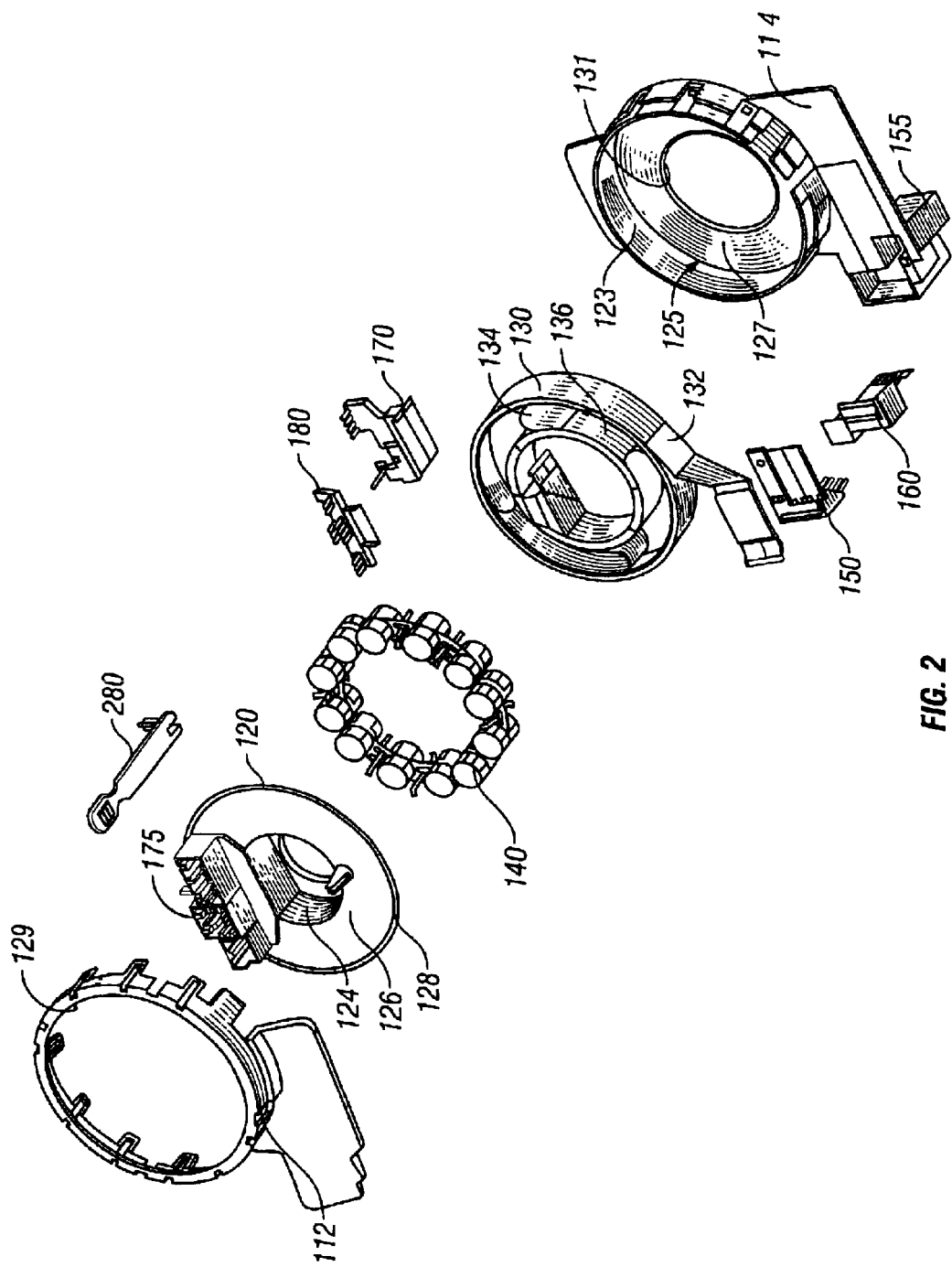
FIG. 2 is an exploded view of a clockspring.

Each of the cables 130 has one end connected to one of the base lead frames 150, 160, and the other end connected to a respective one of the shell lead frames 170, 180. Each cable 130 extends in an outer portion 132 along the outer wall 123 of the accommodating space 125 in a first direction, e.g., in a counterclockwise direction in the embodiment shown in FIG. 2. The cable 130 then passes between two of the adjacent guiding mechanisms 140 in a loop back portion 134. As can be seen, each cable 130 passes between a different pair of guiding mechanisms 140. Each cable 130 loops back so that it extends in an inner portion 136 along the inner wall 124 of the accommodating space 125 in the opposite direction from that which it extended along the outer wall 123. As the hub 120 and shell 110 rotate with respect to each other, the cables 130 accumulate along the inner wall 124 and decrease along the outer wall 123, or vice versa.

Figure 3A:
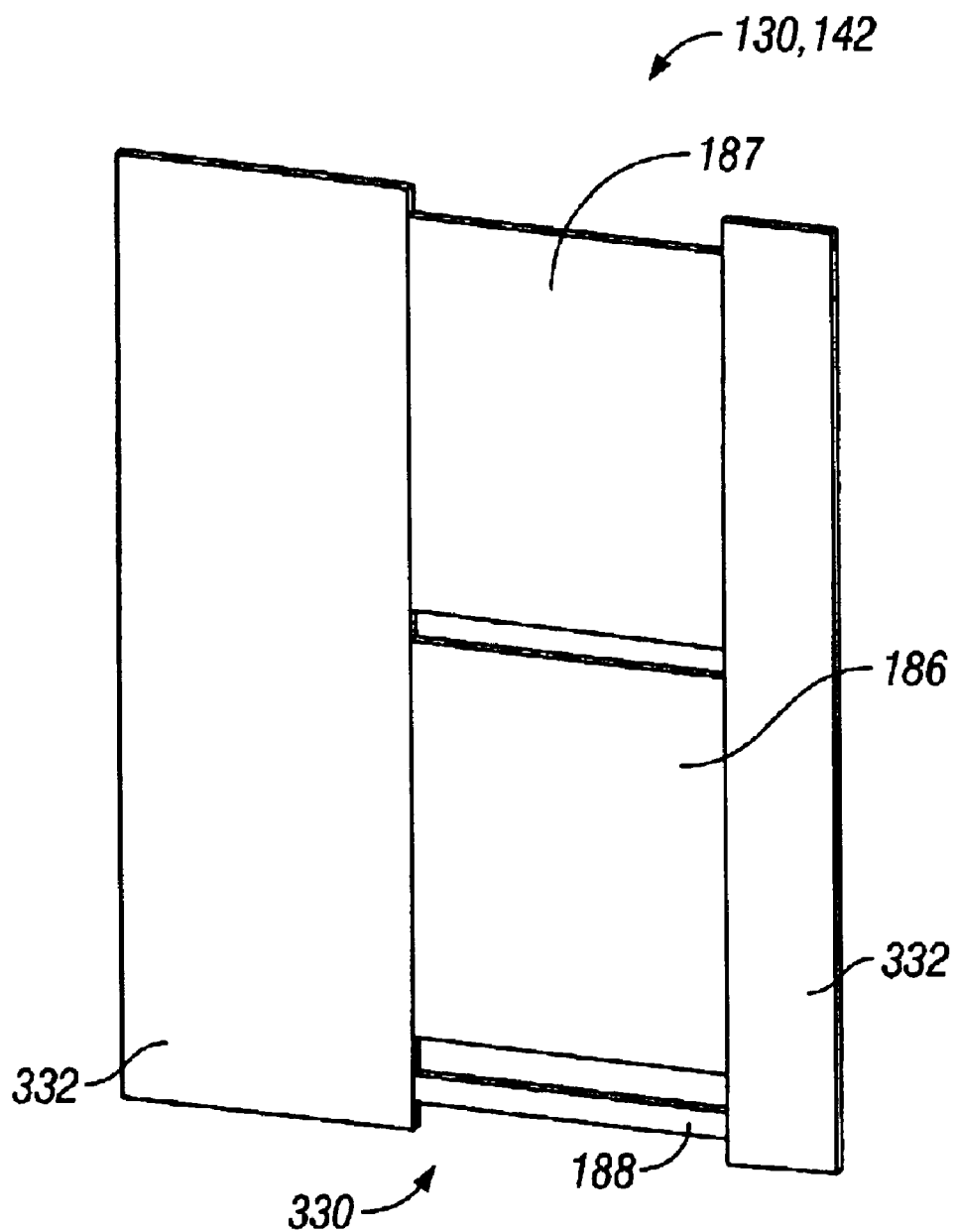
FIG. 3A is a perspective view of a first flexible cable employed in the clockspring.
Figure 3B:
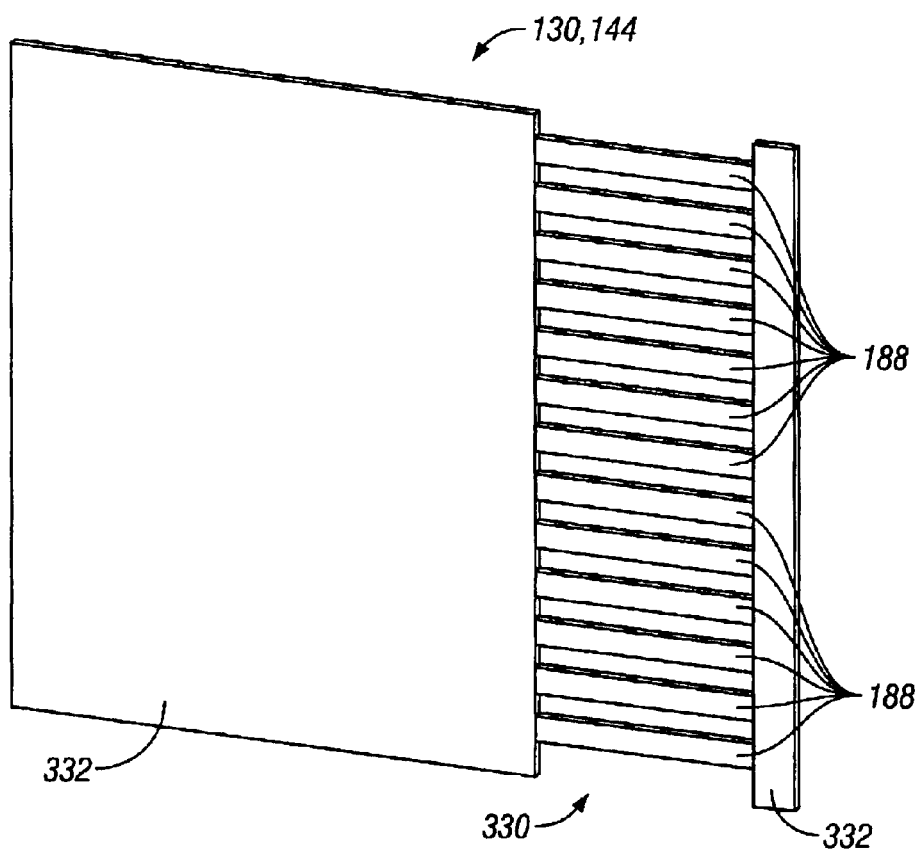
FIG. 3B is a perspective view of a second flexible cable of the clockspring.

FIGS. 3A and 3B illustrate embodiments of flex flat cables 130 that can be employed in the clockspring 110. In particular, FIG. 3A shows a combined high/low current flex cable 142, whereas FIG. 3B shows a low current flex cable 144. Each cable 142, 144 includes a plurality of conductive paths defined by copper traces. In the illustrated embodiment, the cable 142 includes a plurality (two shown) of high current conductive paths 186, 187 and one of low current conductive path 188. Conversely, the low current flex cable includes a plurality (thirteen shown) of low current conductive paths 188. Hence, the cables 130 provide a total of six high current conductive paths 186, 187 and sixteen low current paths 187. In the illustrated embodiment, the high current paths 186 are used for the positive high current path, whereas the high current paths 187 provide the high current ground path. As will be appreciated, the low current paths may similarly be divided between positive and ground connections. Moreover, it will be appreciated that separate cables could be used for high and low currents. Typically, each of the low current traces will be interconnected between single terminals carried each of the low current lead frames 160, 180. By contrast, a plurality of the high current conductive paths may be connected to single high current terminals on each of the high/low current lead frames 150, 170, so that high current, e.g., 14 amps, is divided into two or more current paths as it passes across the clockspring connector 10. In the illustrated embodiment, the high current is divided into six high current paths 187 (three ground and three positive) carried by three separate cables. Dividing the high current into multiple paths allows high current to pass through the connector 10 at lower temperatures than would otherwise exist if a single current path were used. This reduces the tendency for the cables 130 to fail, e.g., delaminate during operation and improves the ability to maintain electrical continuity. Using a plurality of reduced current paths (traces) to pass high current across the connector makes it possible to use flex cable in high current application.

The guiding mechanisms 140 allow the hub 120 and shell 110 to rotate smoothly with respect to each other without tangling or deformation of the cables 130. The guiding mechanisms 140 are not fixed in position. As the hub 120 and shell 110 rotate with respect to each other, the cables 130 accumulate along the inner wall 124 and decrease along the outer wall 123, or vice versa. The guiding mechanisms 140 are able to move radially inward or outward, as well as clockwise or counterclockwise, allowing the guiding mechanisms 140 to adjust position in response to the changes in cable distribution along the inner and outer walls 123, 124.

As was discussed above, automobile applications typically require that a clockspring connector provide a total of 5 turns of rotation between its travel limits, namely two-and-a-half turns both clockwise and counterclockwise from the neutral or zero position. When the clockspring connector is turned, the cables 130 either wind around the inner or outer wall of the accommodating space, depending on the relative position of the connector portions 110, 120 and their direction of rotation. For example, as the cables 130 winds around the inner wall 124 of the accommodating space 125, the layers of cable 130 accumulate (get thicker) in the inner space defined between the assemblies 140 and the inner wall 124. Simultaneously, the cables 130 unwind from the outer wall 123 of the accommodating space 125 and empty from the outer space defined between the guiding mechanisms 140 and the outer wall 123 of the accommodating space 125. As this occurs, the layers of cable 130 will have tendency to move radially inward or outward, depending of the position and direction of rotation, to balance the inner and outer spaces of the accommodating space. Known clockspring connectors have a one-piece guiding mechanism, which cannot move radially inwardly or outwardly. As a result, when the cables move radially inwardly or outwardly, they impinge upon the guiding mechanism causing the cables to buckle and prevent normal operation of the clockspring connector. The present clockspring connector uses multiple guiding mechanisms 140 that can move radially inwardly or outwardly, thereby preventing the above problem associated with previous loop back design clockspring connectors, particularly those which employ a single piece guiding mechanism. Passing the cables 130 between separate guiding mechanisms 140 also allows for a relatively wider cable 130 than the other loop back clockspring connectors that use a single guiding mechanism, because there is no carrier base interfering with the placement of the cable 130. Wider cable 130 allows for either greater numbers of copper traces, or copper traces with greater width. Nevertheless, it will be appreciated that other embodiments may have each cable 130 pass between rollers on individual guiding mechanisms, i.e. through the guiding mechanisms rather than between them. Such an embodiment would still retain the benefit of allowing the guiding mechanisms to adjust their position.

Figure 4:
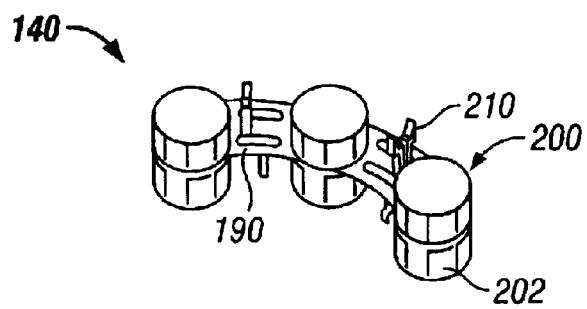
FIG. 4 is a perspective view of one embodiment of a guiding mechanism.
Figure 5:
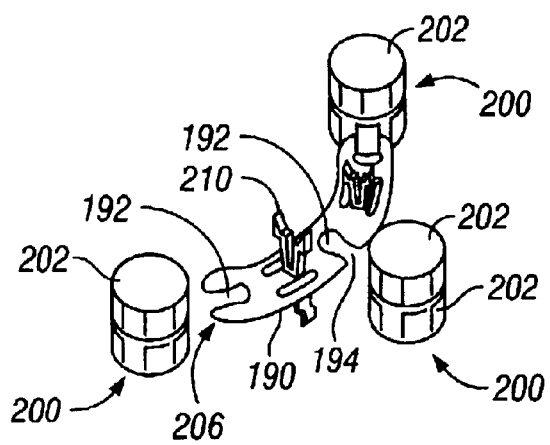
FIG. 5 is a perspective exploded view of the guiding mechanism of FIG. 4.
Figure 6:
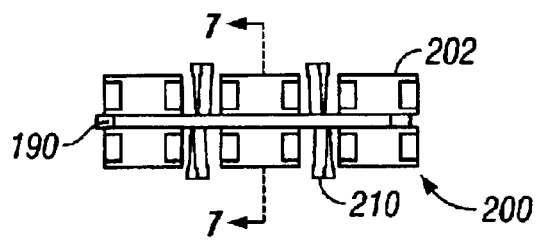
FIG. 6 is a side view of the guiding mechanism of FIG. 4.
Figure 7:
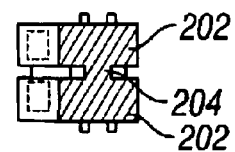
FIG. 7 is a cross sectional view of the guiding mechanism along line A—A of FIG. 6.

As can be seen in FIGS. 4–6, each guiding mechanism 140 comprises a base 190 and at least one roller 200 rotatably mounted on the base 190. The roller 200 comprises two enlarged diameter wheel-shaped sections 202 attached by a reduced diameter axle portion 204. The axle portion 204 rotatably mounts in an opening 192 formed in the base 190 to allow the roller 200 to rotate relative to the base 190. In the illustrated embodiment, the rollers 200 are configured to snap fit into the openings 192. In this respect, the openings 192 are provided with a side cut outs 194 that allows the axle portion 204 to slide laterally into the opening 190. It will be appreciated that other embodiments are possible. For example, one of the wheel-shaped portions 202 could be removable, whereby the axle 204 would be inserted through a circular opening in the base, whereupon the wheel-shaped portion would be reattached to the axle, securing the roller to the base.

The guiding mechanisms 140 include flexible arms or members 210. The flexible members 210 extend from the top and bottom of the base 190 and engage against the top and bottom walls 126, 127 of the accommodating space 125. The interface between the flexible members 210 and walls 126, 127 restricts vertical movement of the guiding mechanisms 140 within the accommodating space 125, thereby reducing operational noise. The flexible members also guide the guiding mechanisms as they move within the accommodating space 125. The flexible members 210 also reduce the area of surface contact between the guiding mechanisms 140 and the housing portions 110, 120, thereby providing for smoother, quieter operation.

Figure 8:
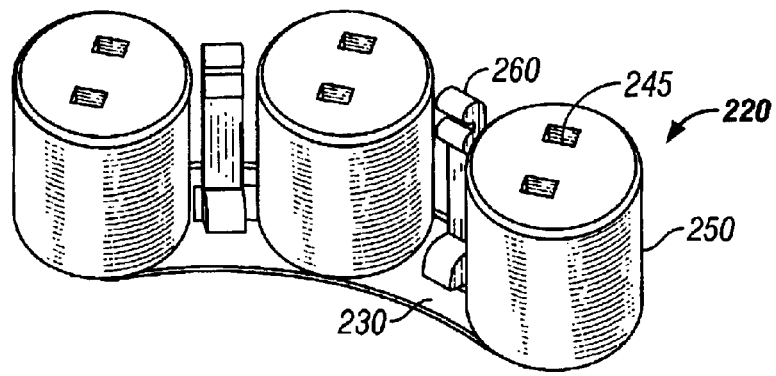
FIG. 8 is a perspective view of an alternate embodiment of a guiding mechanism.
Figure 9:
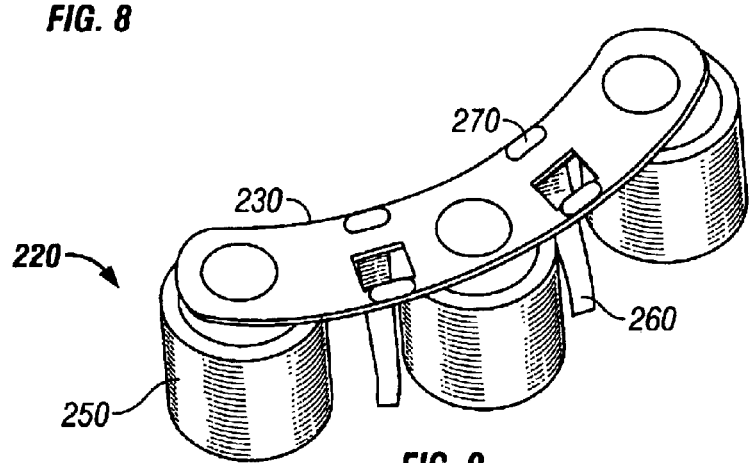
FIG. 9 is a bottom perspective view of the alternate guiding mechanism of FIG. 8.
Figure 10:
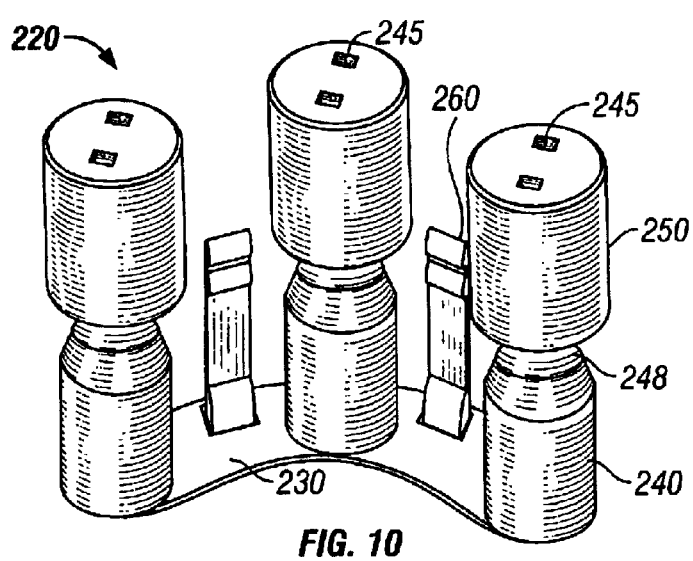
FIG. 10 is an exploded perspective view of the alternate guiding mechanism of FIG. 9.

All or some of the components of the guiding mechanisms 140, including the flexible members 210, may be formed from a material different from that which used to form the housing. For example, the housing portions 110, 120 may be formed from polybutylene terephthalate (PBT) and the flexible members 210 may be formed from polyoxymethylene (POM) or polyacetal. By using different materials to form the components that movably engage with one another it is possible to reduce to reduce frictional noise generated by rubbing between these components FIGS. 8–10 illustrate an alternative guiding mechanism 220. In this embodiment, rollers 250 are mounted for rotation on posts 240 formed on the base 230. Features are provided for securing the rollers 250 to the posts 240. In the illustrated embodiment, the securing features includes locking fingers 245 on the rollers 250 that mate with openings 248 formed in the tops of the posts 240. In this embodiment, the rollers 250 only extend from one side, e.g., the top, of the base 230. The base 230 may include flexible members or arms 260 that contact the housing 100 in the manner described above in connection with the guiding mechanism 140. Pads 270 may be placed on the bottom of the base 230 to reduce noise by reducing the surface area of the base 230 that contacts the bottom wall 127 of the housing. The cables 130 pass preferably between adjacent guiding mechanisms 220, in the manner described above.

As shown in FIG. 1, a locking clip 280, as is commonly provided, may be used to prevent the hub from turning until the clip 280 is removed. The locking clip 280 can be used, for example, to lock the clockspring in its neutral or zero position during shipping. The locking clip 280 is removed during the installation of the clockspring to the vehicle.

Figure 11:
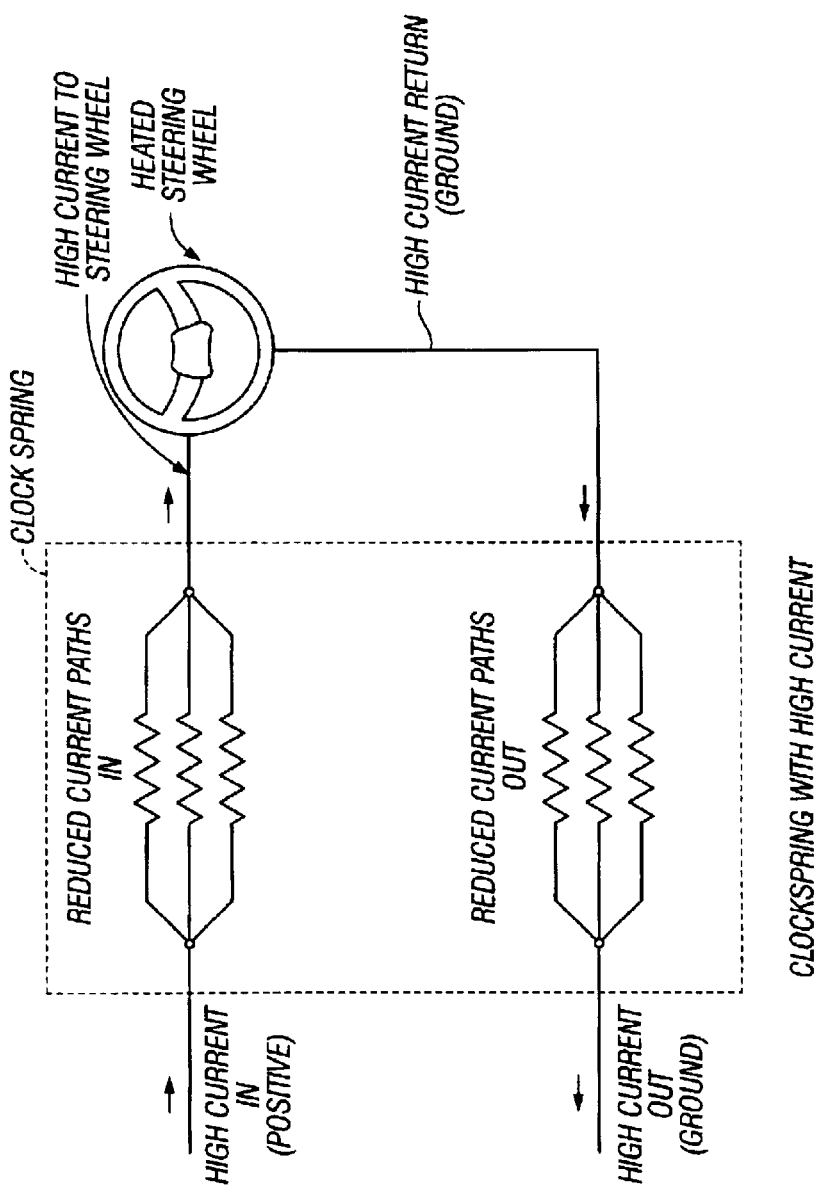
FIG. 11 is a schematic illustration of a high current circuit according to certain aspects of the present invention.

FIGS. 11–17 illustrate certain aspects of a high current circuit that can be used to pass relatively high currents through the clockspring connector 10. It will be appreciated that the high current circuit can be used with clockspring connectors other than the one shown and described in the present application, or with connectors other than clockspring connectors. FIG. 11 schematically illustrates the manner in which the high current circuit works. High current, e.g., 14 amps, enters the clockspring connector, e.g. via lead frame 150 on the base 114. The current is then split into a plurality of reduced current paths on one or more of the flat cables 130. In the illustrated embodiment, the positive high current is split into three reduced current paths 187, one on each of the three high/low current flex cables 142. The reduced current paths are rejoined into a single high current path on the other end of the clockspring connector, e.g. by the high current lead frame 170 on the hub 120. The high current then passes through a device, such as a heated steering wheel, and returns across the clockspring connector via multiple low current paths in the manner described above.

Figure 12:
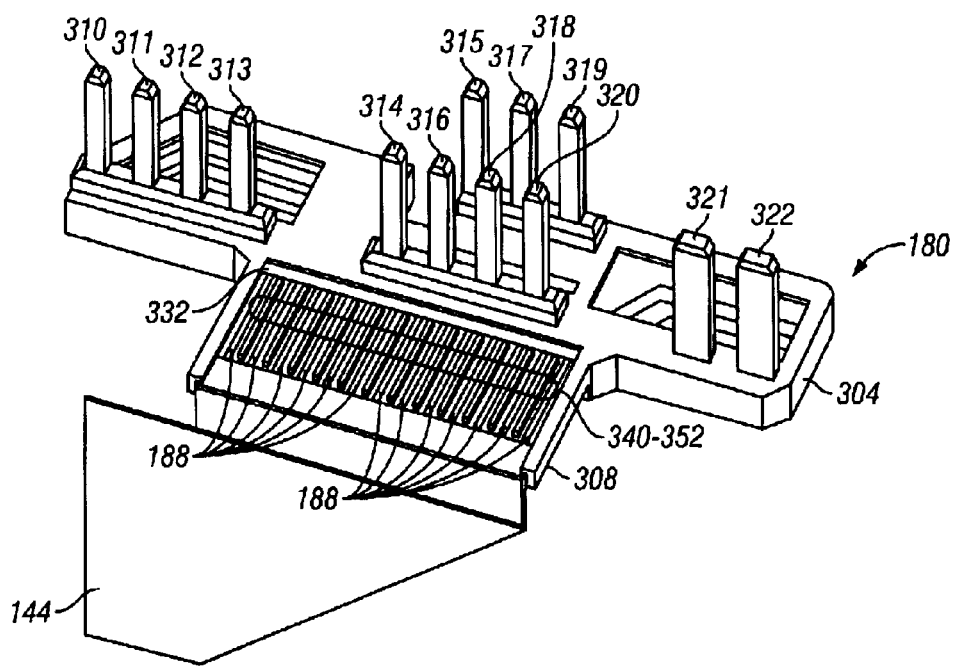
FIGS. 12–14 illustrate a first lead frame assembly that can be used in the clockspring of FIG. 1.
Figure 13:
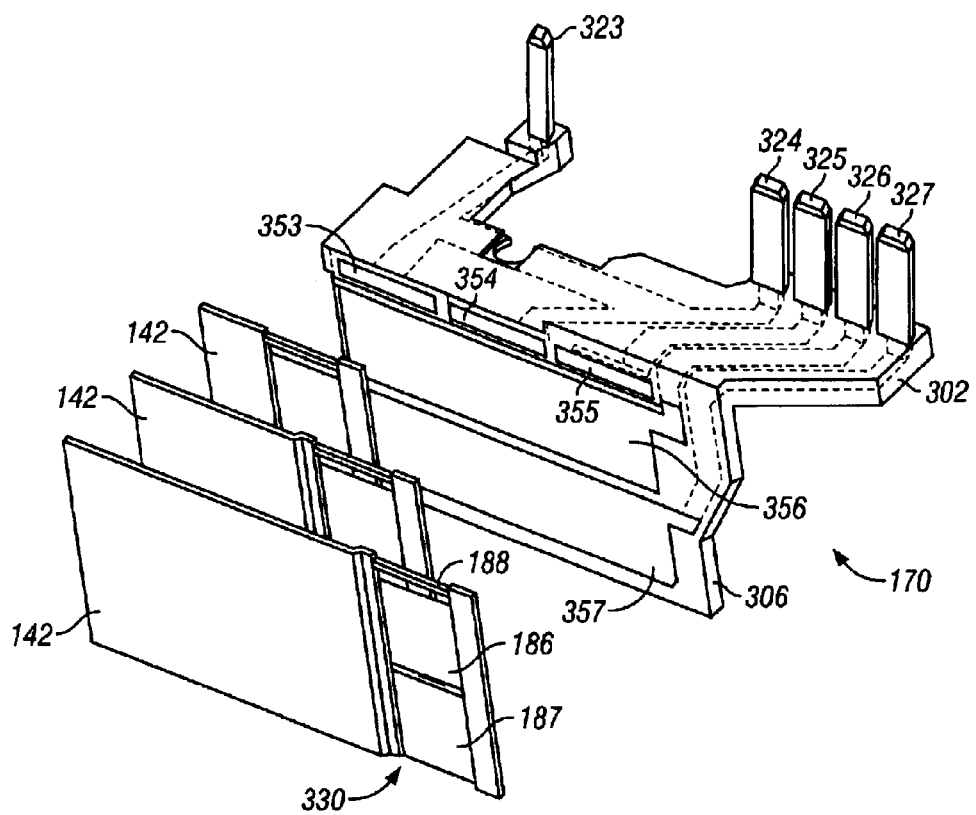
Figure 14:
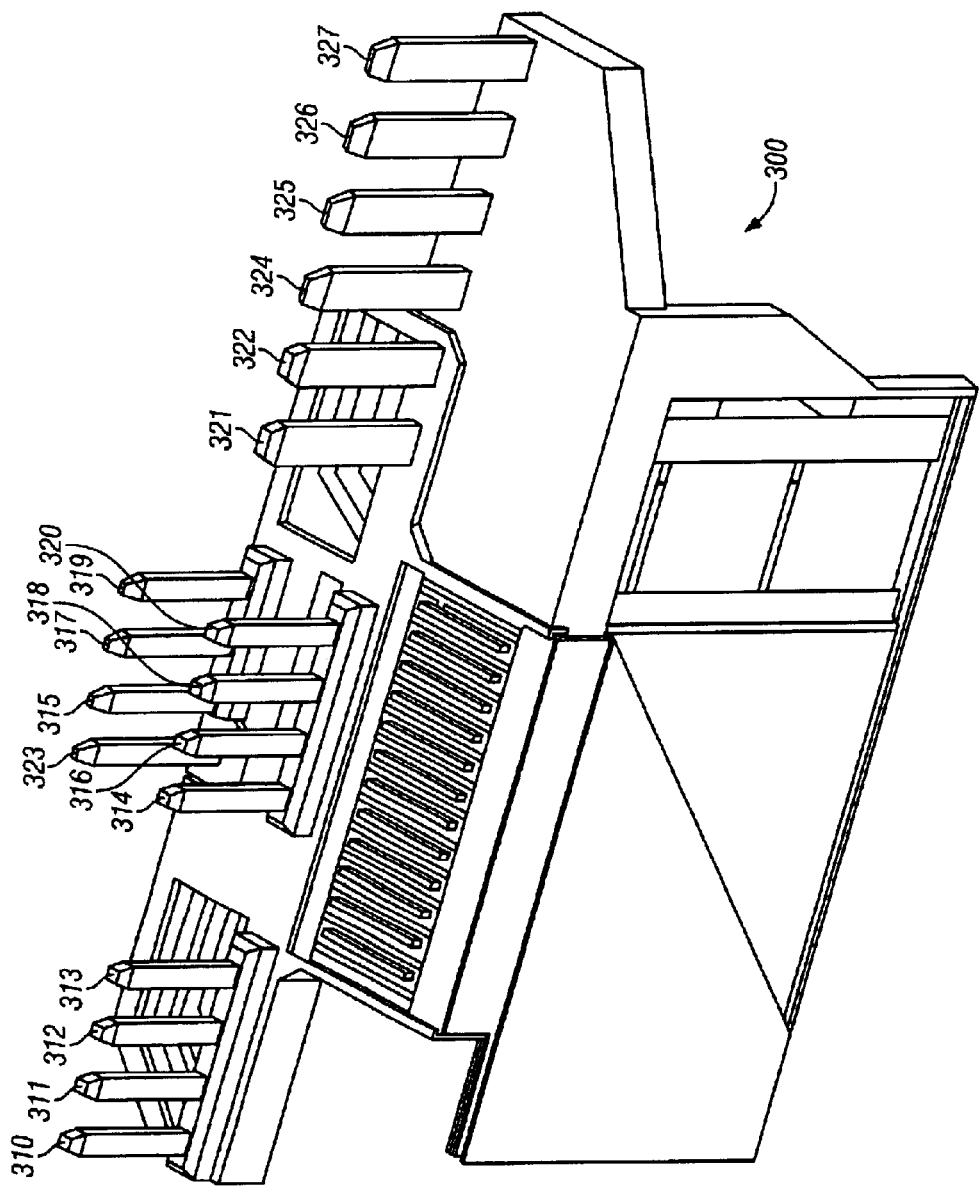

Referring to FIGS. 12–14, the lead frame connectors 170, 180 are joined to one another, e.g., by sonic welding and/or mechanical features, to form a unitary upper (or hub) lead frame assembly 300. The upper lead frame assembly 300 is configured for mounting in the socket 175 in the hub 120.

Each of the lead frames 170 and 180 has a respective first end 302, 304 and a respective second end 306, 308. The first ends 302, 304 present connection terminals 310–327 that are adapted to mate with terminals (not shown) from an external device, such as another connector (not shown). In the illustrated embodiment, the terminals 310–327 comprise male terminals or pins, but it will be appreciated that they could take other forms such as female connectors or conductive traces. In the illustrated embodiment, the terminals are divided to low current terminals 310–325 and high current terminals 326, 327. The terminal 326 serves as the positive high current terminal, while the terminal 327 serves as the high current ground terminal. It will be appreciated that the number of terminals will vary depending on the given application in which the lead frame assembly 300 is used.

The second ends 306, 308 of the lead frames 170, 180 are configured to mate with the ends of the flex cables 130. Specifically, the high/low current lead frame 170 mates with one end of each of the three of the high/low current cables 142, whereas the low current lead frame 180 mates with one end of the low current cable 144. For this purpose, the ends of the cables 142, 144 include respective connection portions 330 where the copper traces 186, 187, 188 are exposed. On either side of the connection portion 330, the copper traces 186, 187, 188 are covered by the insulating material 332 of the cable 142. As can be seen in FIG. 12, the exposed low current traces 188 on the low current cable 144 are configured to align and mate with respective low current terminals 340–352 in the second end 308 of the lead frame 180. Each low current connection terminal 310–322 in the first end 304 of the lead frame 180 is electrically interconnected with a respective one the low current connection terminals 340–352 in the second end 308 of the lead frame 180, e.g., by conductive paths within the lead frame 180.

Similarly, the second end 306 of the lead frame 170 presents terminals 353–357 that are positioned to align and electrically mate with the copper traces in the connector portions 330 of the three high/low current cables 142. Specifically, the second end 306 of lead frame 170 includes three low current terminals 353, 354, 355, a positive high current terminal 356, and a ground high current terminal 357. Each of the low current terminals 353, 354, 355 is electrically interconnected with a respective one of the low current terminals 323, 234, 325 in the first end 302, whereas each of the high current terminals 356, 357 is electrically interconnected with a respective one of the high current terminals 326, 327. Each of the low current terminals 353, 354, 355 is sized and positioned to mate with one of the low current traces 188 in a different one of the cables 142 when the cables are connected to the second end 306 of the lead frame 170. Conversely, the high current terminal 356 is sized and positioned to electrically mate with positive high conductive traces 186 on all three of the cables 142, and the ground high current terminal 357 is sized and positioned to electrically mate with the high current ground traces 187 on all three of the cables 142. Hence, the high current is split into six reduced current paths—three positive paths 186 and three ground paths 187—as it is passed through the clockspring connector. Splitting the high current into multiple reduced current paths on the cables 130a, 130b allow high current to pass through a connector, such as the clockspring connector 10, at lower temperatures than would occur if a single current path were used.

Figure 17:
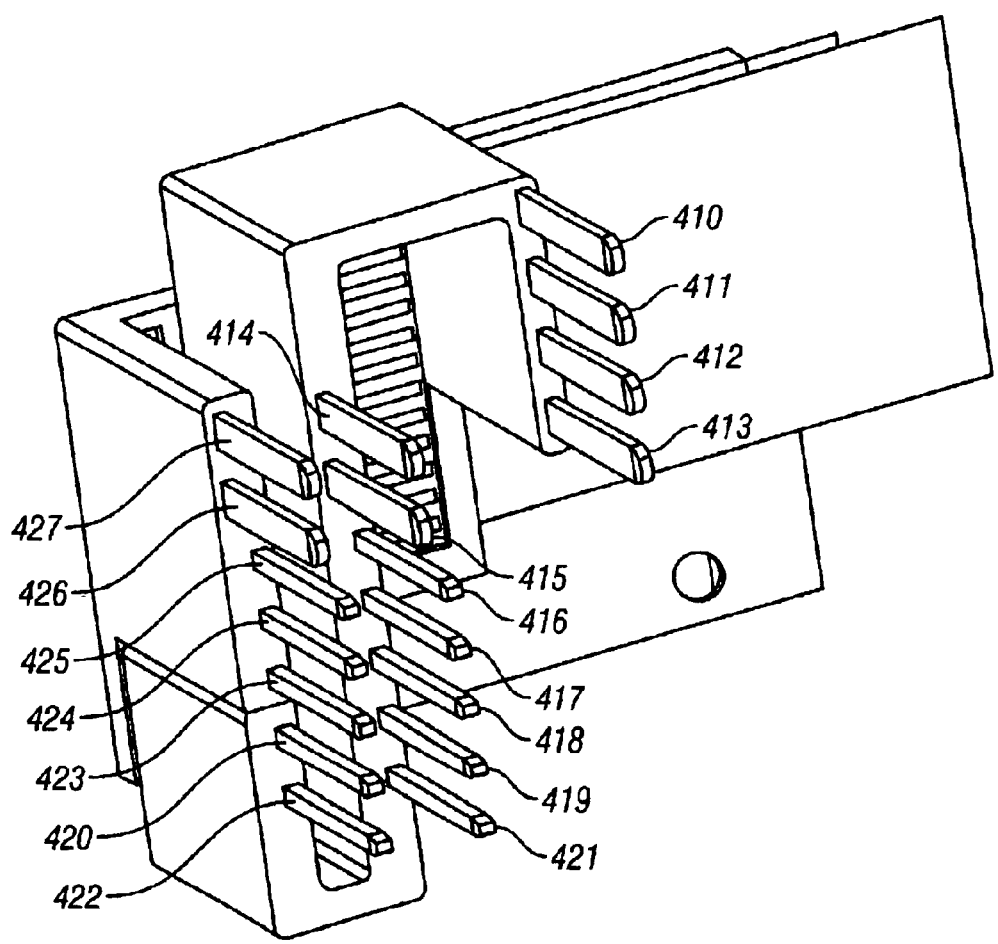

Referring to FIGS. 15–17, the lead frame connectors 150, 160 are joined to one another, e.g., by sonic welding and/or mechanical features, to form a unitary lower (or base) lead frame assembly 400. The lower lead frame assembly 400 is configured for mounting in the socket 155 in the base 114. Each of the lead frames 150, 160 has a respective first end 402, 404 and a respective second end 406, 408. The first ends 402, 404 present connection terminals 410–427 that are adapted to mate with terminals (not shown) from an external device, such as another connector (not shown). In the illustrated embodiment, the terminals are divided into low current terminals 410–425 and are high current terminals 426, 427. The terminal 426 serves as the positive high current terminal, while the terminal 427 serves as the high current ground terminal.

The second ends 406, 408 of the lead frames 150, 160 are configured to mate one the other ends of the flex cables 130. Specifically, the high/low current lead frame 160 mates with connection portions 330 in the ends of the three of the high/low current cables 142, whereas the low current lead frame 150 mates with the connection portion 330 in the end of the low current cable 144. The exposed low current traces 188 on the low current cable 144 are configured to align and mate with respective low current terminals 440–455 in the second end 408 of the lead frame 160. Each of the low current connection terminals 410–422 in the first end 404 of the lead frame 160 is electrically interconnected with a respective one the low current connection terminals 440–452 in the second end 408 of the lead frame 180, e.g., by conductive paths within the lead frame 180.

Similarly, the second end of the lead frame 150 presents terminals that are positioned to align and electrically mate with the copper traces of in the connector portions 330 of the three high/low current cables 142. Specifically, the second end 406 of lead frame 150 includes three low current terminals 453, 454, 455, a positive high current terminal 456, and a high current ground terminal 457. Each of the low current terminals 453, 454, 455 is electrically interconnected with a respective one of the low current terminals 423, 434, 425 in the first end 302 of the lead frame, whereas each of the high current terminals 456, 457 is electrically interconnected with a respective one of the high current terminals 426, 427. Each of the low current terminals 453, 454, 455 is sized and positioned to mate with one of the low current traces 188 in a different one of the cables 142. Conversely, the positive high current terminal 456 electrically mates with the positive conductive traces 187 on all three of the cables 142, and the high current ground terminal 457 electrically mates with the ground traces 187 on all three of the cables 142.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A clockspring connector comprising:
    a housing having first and second housing sections, the housing sections being rotatable relative to one another and defining an accommodating space having an inner annular wall and an outer annular wall;
    at least two guiding mechanisms mounted in the accommodating space for movement radially inwardly and outwardly within the accommodating space;
    at least two flexible cables, each cable having one end connected to the first housing section and the other end connected to the second housing section, each cable having a first portion wound around the outer annular wall in a first direction, a second portion wound around the inner annular wall in a second direction opposite the first direction, and a loop back portion passing between two of the guiding mechanisms.

2. The clockspring connector of claim 1, wherein:
    the first housing section comprises a base and a mating cover; and
    the second housing section comprises a hub rotatably mounted between the base and the cover.

3. The clockspring connector of claim 1, wherein each guiding mechanism comprises a base and at least one roller rotatably mounted to the base.

4. The clockspring connector of claim 3, wherein each roller comprises two sections connected by an axle which mates with a reciprocal opening formed in the base to permit rotation of the roller with respect to the base.

5. The clockspring connector of claim 4, wherein the axle snap fits into the reciprocal opening in the base.

6. The clockspring connector of claim 1, wherein each guiding mechanism includes a base, an upstanding post extending from the base, and a roller rotatably mounted on the post.

7. The clockspring connector of claim 6, further comprising locking features formed on the roller and the post for locking the roller onto the post.

8. The clockspring connector of claim 7, wherein the locking feature comprises flexible fingers formed on the roller and being adapted to engage with a reciprocal opening on the post for locking the roller onto the post.

9. The clockspring connector of claim 6, further comprising reduced surface area pads on the base of the guiding mechanism, the pads engaging against an interior surface of the accommodating space to reduce the surface area of the guiding mechanism that contacts the housing.

10. The clockspring connector of claim 1, wherein each guiding mechanism comprises flexible members adapted to contact the housing in order to reduce rattling and noise and facilitate smooth movement of each guiding mechanism.

11. The clockspring connector of claim 1, wherein the number of guiding mechanisms equals the number of cables.

12. The clockspring connector of claim 1, further comprising a lead frame on the first housing section and a lead frame on the second housing section, each lead frame having at least one terminals that is connected to a plurality of current paths on at least one of the flexible cables, whereby current is split into multiple current paths as it passes through the clockspring connector in a high current application.

13. The clockspring connector as set forth in claim 1, further comprising:

means on one of the housing sections for receiving current from an external source;

means within the clockspring connector for splitting the current into a plurality of current paths that extend between the first and second connector portion; and means on the other of the first and second housing sections for rejoining the multiple current paths into a single current path exiting the clockspring connector.

14. A clockspring connector comprising:

a housing having first and second housing sections, the housing sections being rotatable relative to one another and defining an annular accommodating space having an inner annular wall and an outer annular wall;

at least two arcuate guiding mechanisms disposed adjacent to one another in the accommodating space, the guiding mechanisms free to move laterally and longitudinally within the accommodating space, each guiding mechanism including a base and a roller rotatably connected to the base, the guiding mechanisms dividing the accommodating space into an inner space between guiding mechanisms and the inner annular wall and an outer space between the guiding mechanisms and the outer annular wall; and at least two flexible cables, each cable having one end connected to the housing first portion and the other end connected to the housing second portion, each cable having a first portion extending within the outer space in a first direction, a second portion extending within the inner accommodating space in a second direction opposite the first direction, and a reversal portion which passes between two of the adjacent guiding mechanisms and loops around a roller on one of the guiding mechanisms.

15. The clockspring connector of claim 14, wherein:

the first housing section comprises a base and a mating cover; and the second housing section comprises a hub rotatably mounted between the base and the cover.

16. The clockspring connector of claim 14, wherein each roller comprises two sections connected by an axle which mates with a reciprocal opening formed in the base to permit rotation of the roller with respect to the base.

17. The clockspring connector of claim 14, wherein each guiding mechanism includes a base, an upstanding post extending from the base, and a roller rotatably mounted on the post.

18. The clockspring connector of claim 14, wherein the number of guiding mechanisms equals the number of cables.

19. The clockspring connector of claim 14, wherein at least one cable contains at least two current conducting paths.

20. The clockspring connector of claim 19, wherein each of the current conducting paths has the same current carrying capacity.

21. The clockspring connector of claim 14, further comprising a lead frame on the first housing section and a lead frame on the second housing section, each lead frame having at least one terminals that is connected to a plurality of current paths on at least one of the flexible cables, whereby current is split into multiple current paths as it passes through the clockspring connector.

22. A clockspring connector, comprising:

a housing having inner and outer annular walls rotatable relative to one another and separated by an accommodating space;

first and second terminals joined to said housing;

a guiding mechanism disposed in the accommodating space; and a flexible cable disposed in the accommodating space, said flexible cable having a first portion wound along the outer annular wall in a first direction with a first end connected to the first terminal, the flexible cable having a second portion wound along the inner annular wall in a second direction with a second end connected to the second terminal, the flexible cable having a loop back portion joining the first and second portions, the first, second and loop back portions carrying a plurality of conductive paths that merge with one another at the first terminal and at the second terminal.

23. The clockspring connector of claim 22, further comprising at least two of the guiding mechanisms, the loop back portion of the flexible cable passing between the two guide mechanisms.

24. The clockspring connector of claim 22, further comprising at least two of the flexible cables.

25. The clockspring connector of claim 1, wherein at least one of the flexible cables carries a plurality of conductive paths extending between the ends of the flexible cables, the plurality of conductive paths merging at opposite ends of the flexible cable.

26. The clockspring connector of claim 1, further comprising:

a plurality of internal conductive paths extending between input and output ends of the connector;

an input terminal in the input end of the connector, the input terminal being connected to divide current from a single conductive path external from the connector between the plurality of internal conductive paths; and an output terminal in the output end of the connector, the output terminal being connected to merge current from the plurality of conductive paths into a single conductive path that exits the electrical connector.

27. The clockspring connector of claim 14, wherein at least one of the flexible cables carries a plurality of conductive paths extending between the ends of the flexible cables, the plurality of conductive paths merging at opposite ends of the flexible cable.

28. The clockspring connector of claim 14, further comprising:

a plurality of internal conductive paths extending between input and output ends of the connector;

an input terminal in the input end of the connector, the input terminal being connected to divide current from a single conductive path external from the connector between the plurality of internal conductive paths; and an output terminal in the output end of the connector, the output terminal being connected to merge current from plurality of conductive paths into a single conductive path that exits the electrical connector.

* * * * *